United States Patent [19]
Newman

[11] Patent Number: 5,774,833
[45] Date of Patent: Jun. 30, 1998

[54] METHOD FOR SYNTACTIC AND SEMANTIC ANALYSIS OF PATENT TEXT AND DRAWINGS

[75] Inventor: Marc Alan Newman, Mesa, Ariz.

[73] Assignee: Motorola, Inc., Schaumburg, Ill.

[21] Appl. No.: 569,053

[22] Filed: Dec. 8, 1995

[51] Int. Cl.[6] .................................................. G06F 17/28
[52] U.S. Cl. .................................................................. 704/9
[58] Field of Search ................................... 395/615, 800, 395/209, 751, 793, 801; 707/104, 531, 538; 704/1, 9

[56] References Cited

PUBLICATIONS

"The Examiner Software Report Referenc", Version 2.44, The Examiner Software For DOS, pp. i–23, The Examiner—Intelligent Tools for the Intellectual Property Industry (1993).
"The Examiner Software Installation Guide", Version 2.44, The Examiner Software For DOS, pp. 1–6, The Examiner—Intelligent Tools for the Intellectual Property Industry (1963).
"The Examiner Software User's Guide", Version 2.44, The Examiner Software For DOS, pp. 1–39, The Examiner—Intelligent Tools for the Intellectual Property Industry (1993).
"The Examiner Software Tutorial Guide", Version 2.44, The Examiner Software For DOS, pp. 1–29, and Appendix A and B, The Examiner—Intelligent Tools for the Intellectual Property Industry (1993).

The Law Works, "The Examiner Software", Sep. 1995, p. 19.

*Primary Examiner*—Donald E. McElheny, Jr.
*Attorney, Agent, or Firm*—Bradley J. Botsch, Sr.

[57] ABSTRACT

A method for processing patent text (99) in a computer (200) including identifying boundaries of parts of patent text (100), loading at least one of the parts of the patent text into a working memory (102), analyzing at least one of the parts of the patent text (104), and reporting results (106) to a user (202). Alphanumeric drawing data can also be compared to patent text (100). The method can be coupled to work with a word processor program (208). The method can recognize and report (106 and 708) on claim dependency (400, 402, 404), specific characteristics (704) of patent text (99), and patent errors based on legal standards, practice standards, and Patent and Trademark Office standards, or even user preferences (702, 704, 706).

34 Claims, 4 Drawing Sheets

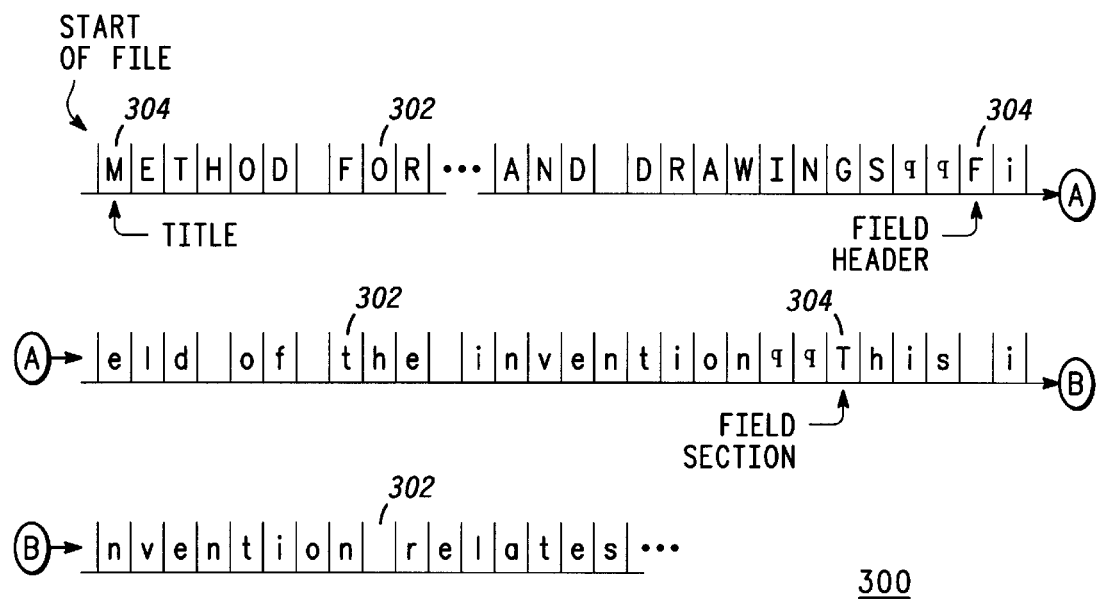
FIG. 3
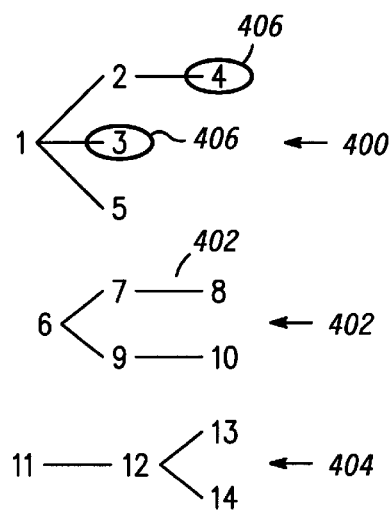
FIG. 4
FIG. 5

METHOD FOR SYNTACTIC AND SEMANTIC ANALYSIS OF PATENT TEXT AND DRAWINGS

The invention relates generally to computer processing, and more particularly, to syntactic and semantic analysis of text and graphics.

Background of the Invention

With the advent and increasing ubiquitousness of personal computers, the production of textual and graphical documents have been greatly improved over previous methods such as using typewriters. Computers have allowed people to more easily manipulate text within and among computer documents as well as provide additional tools to help construct and edit text. For example, many of today's word processors include writing tools such as spelling checkers and grammar checkers. It is generally agreed that these types of tools have improved the efficiency of producing quality documents.

Techniques found in Natural Language Processing, a field of study intersecting Artificial Intelligence and Linguistics, are often used to perform the various types of syntax processing found in today's grammar checkers. Gramatik by Word Perfect Corporation and RIGHTwriter by Que, a division of Macmillan Computer Publishing, are two such commercially available grammar checkers.

These grammar checkers are general-purpose in that they can be used to check the syntax of many types of textual documents from personal letters to newspaper articles to research papers. While such general-purpose tools can be useful, they are of little benefit when applied to specific domains that don't necessarily follow the grammatical syntax for which the tools were intended. For example, in the domain of patent law, certain components of patents (e.g., claims) are constructed in a "legalese" grammar that is different than the English grammar found in your typical newspaper article or letter to grandma. In addition, U.S. patent applications are required by the United States Patent and Trademark Office to follow a specific overall format.

General-purpose grammar checkers are unable to adequately check these syntactical constructs. Furthermore, while general-purpose grammar checkers are able to check a document's syntax, they do not check, for the most part, the semantics (i.e., the meaning) of the text they process. The construction and checking of patent applications, however, can greatly benefit from certain domain-specific types of semantic checking such as identifying whether a reference has unambiguous antecedent basis support and whether claims are properly ordered based on their dependencies. In addition, patents also contain graphical components (e.g., the drawings) that relate to (and are related by) textual components within the application as required by patent law. Checking the relationships among the textual and graphical components of patent applications would also prove beneficial. Therefore, what is needed is a method for checking both the syntax and semantics of patents and patent applications.

BRIEF DESCRIPTION OF THE DRAWINGS

FIG. 3 is a diagram illustrating the first few characters of a computer file containing patent text;

FIG. 4 is a diagram of a claim dependency tree containing three independent claim trees displayed in a graphical manner;

FIG. 5 is a tabular version of the claim dependency tree displayed in FIG. 4;

DETAILED DESCRIPTION OF THE DRAWINGS

Figure 1:
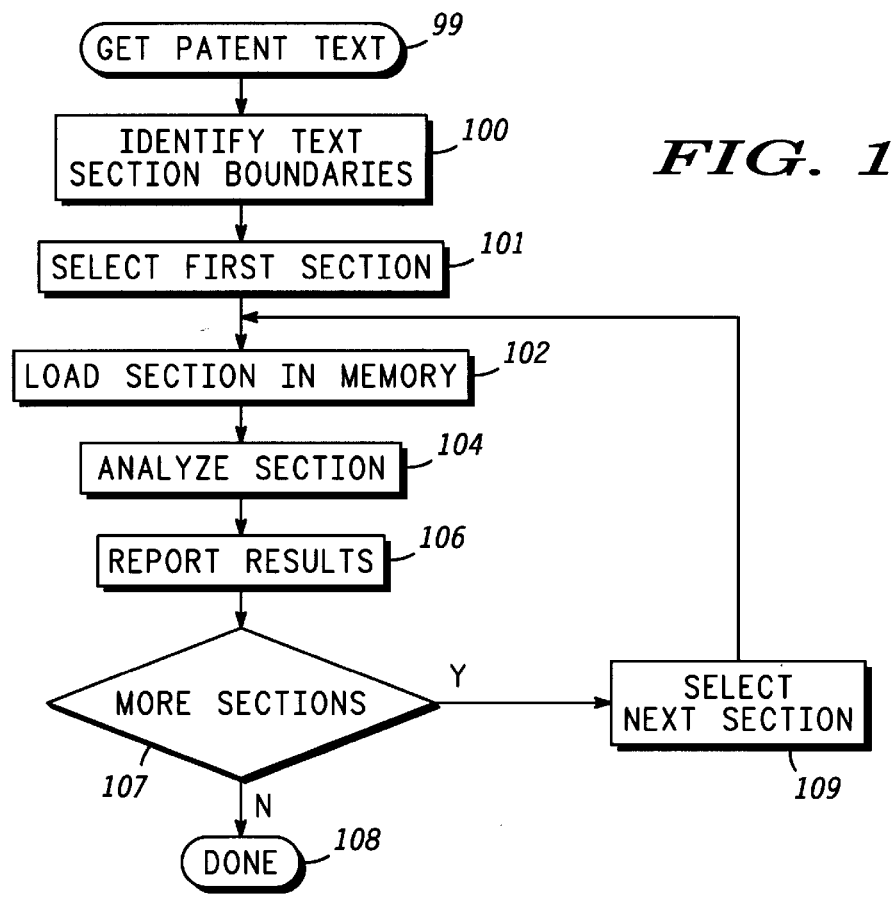
FIG. 1 is a flow chart of the primary processing steps for syntactically and semantically analyzing patent text in a computer.

In FIG. 1 there is shown a method for semantic and syntactic processing of patent text with a computer. Syntax refers to the structure of language. Syntax of written text includes grammar and punctuation covering sentences, paragraphs, and whole sections of text. Semantics refers to the meaning of language.

To demonstrate the distinction between semantics and syntax, consider the sentence "Mary gave a book to John." This sentence has the exact same syntactic structure, but opposite semantic meaning as "John gave a book to Mary." The sentence "A Mary book John to gave" has virtually no semantic or syntactic meaning. The first sentence "Mary gave a book to John" is syntactically correct and unambiguous ("Mary", singular noun, is the subject; "gave" is a singular verb; "a" is an article referring to the noun book which is the object of the verb "gave" comprising the verb phrase "gave a book", etc.). That same sentence is semantically ambiguous because, while it can be presumed that Mary is a female person and John is a male person, it is not clear whether Mary transferred possession, ownership, both possession and ownership, or merely knowledge of a book to John.

The present invention includes semantic and syntactic processing of particular information, i.e. patent text and figures (graphics). "Patent text", as used herein, includes patent applications, issued patents, statutory invention registrations, invention disclosures, and any other technical writing in a patent language type format.

As shown in FIG. 1, the analysis process begins with a specified patent application or issued patent in computer readable form being available for analysis. Once the step 99 of accessing patent text is accomplished, the process of analysis is ready to begin. The first task of the computer program is step 100, identifying the boundaries of the various sections of the patent text.

Patent text sections generally include the title, the field of the invention, background of the invention, summary of the invention, brief description of the drawings, detailed description of the drawings (or preferred embodiments), claims, and the abstract of the invention. Often, additional sections are included, such as a detailed description of the prior art. Often a section, such as the summary, is not included, or is combined with another section, as the field of the invention can be combined with the background of the invention section. Most patent sections are preceded by a header, and the header itself can be considered a patent section, or subsection, for the purpose of the patent text analysis, which is described below.

Identification of section headers, as is shown as step 100 in FIG. 1, is dependent on locating key words in relatively short paragraphs. "Short paragraph" denotes a paragraph of less than one line, where line breaks identify paragraph boundaries. For example, the detailed description of the drawings header can be identified by locating in a case independent manner the character strings "detailed" and "description" in a paragraph having between 35 and 50 characters. That is because "Detailed Description of the Drawing" has 35 characters, where "Detailed Description of the Preferred Embodiments", another valid header for this section, has 50 characters. Note that preceding and following white space characters (such as spaces or tabs) must be ignored. (Further analysis of section headers is performed later in step 104, the analyze sections step, as described later on below.)

The second task in the method of analysis in step 102 in FIG. 1 is loading the desired text section into working memory. FIG. 1 describes the sections being loaded starting with the first section, and progressing through the patent sequentially until each section has been processed. Typically, one section is loaded at a time, but a plurality of parts, i.e., multiple sections, may be simultaneously loaded into working memory when analysis involves multiple sections. Also, specific sections may be selected or rejected for loading step 102, analysis step 104, and reporting step 106. Furthermore, an alternative embodiment may process the text sections in other orders. For example, after the title is processed, the part of the abstract of the disclosure which is expected to contain a copy of the title may be processed next for immediate comparisons between the two copies of the title. The order of processing is not particularly important, as most analysis that requires comparisons between multiple sections can be supported by keeping the relevant data from the first section loaded in memory (step 102) at least until the other related sections have also been loaded, thus allowing the comparisons to be made any time after the loading of the last section.

The step 102 loading of the text sections requires accessing the patent text data from some computer resource. The step 99 accessing of the text will vary depending on the source of the text to be loaded. For instance, if the text is being read from a disk file on the computer, then the access to the data to be loaded into memory (step 102) will typically be via function calls defined by the operating system of the computer, e.g. for accessing data from a disk. If the patent analysis program is integrated with a word processor program, then the loading of data may be via an interface with the word processor program, which may or may not involve coordination with operating system function calls.

Loading sections into memory (step 102) involves extracting the text in the form of character strings from the source (disk file or word processor application) and tokenizing the text for analysis (step 104). Tokenization is the lowest level of parsing which involves parsing character strings to identify the boundaries of words, numbers, punctuation marks, etc. The boundaries of tokens are first separated into character groups, typically by white space characters delimiters (spaces, tabs, line feeds or paragraph marks, and page or section breaks). When the character groups are all alphabetic characters (characters consisting of a, b, c, . . . , z, A, B, C, . . . , and Z), then a word is assumed to be found. When the character groups are all numeric characters (characters consisting of 0, 1, 2, . . . , and 9), then an integer is identified. When a character group contains numeric characters and leading plus (+) or minus (−) characters, or a single period, i.e., decimal point (.), or other character representing exponential notation, then a signed and/or real number is indicated and is so tokenized. Most symbol and punctuation characters are considered separate tokens. Certain character sequences are treated special. For instance, when two numbers are separated by a colon, than that super group of <number> <colon> <number> (with or without space characters surrounding the colon) indicate a numeric ratio. Marking this super group as a single ratio token permits more effective higher level parsing later by avoiding the possibility of the colon being interpreted as another grammatical symbol.

The source patent text is converted from a long string of characters to a list of tokens. A token is a structure which identifies a type and a value. Most tokens are words, numbers, and punctuation marks. For example, the start of the previous paragraph can be tokenized as: [token(word, "Loading"), token(word, "sections"), token(word, "into"), token(word, "memory"), token(integer, "102"), . . . ]. A comma can be tokenized as token(punctuation, ","), etc. The token list can also be represented in a more compact form, e.g., [w(Loading), w(sections), w(into), w(memory), i(102), . . . ]. A specific token representation is not critical, but may be important with regard to the compiler used to generate the final program to be executed. A token list in some specified format is stored in memory for later analysis as shown in step 104.

The process of analyzing a section 104 involves utilizing many different techniques depending on the section and type of analysis. The analysis consists of both syntactic and semantic analysis. The analysis is typically done to identify errors or non-preferred constructs, but may also be used to identify constructs for other uses. For example, claim analysis resulting in the identification of what is known in the patent art as antecedent basis can be used to find antecedent basis errors, such as non-strict antecedent basis, and can also be used to construct a parts list to aid the patent application writer with, e.g., figure analysis. ("Antecedent basis" denotes the requirement that each element or step be introduced by an indefinite article on first introduction (e.g., "a" or "an") and thereafter by a definite article (e.g., "the" or "said").) Also note, that some section analysis 104 (and reporting results 106) can be erroneous. Where analysis is difficult, ambiguous, or involving rare constructs, it is better to allow occasional false reports and let the user compensate by ignoring false results, than to fail to report and risk non-detection. Finally, note that while much analysis is to verify text compliance with proper English grammar or United States Patent and Trademark Office requirements, other analysis can be done to verify compliance with non-required personal preferences, or with foreign patent office requirements.

Syntactical analysis is concerned with sentence structure. Syntactical analysis includes testing for proper punctuation (use of commas, periods, colons, semicolons, etc.), matching plurality between nouns and verbs within sentences, matching verb tenses, checking for proper and consistent capitalization (such as all caps in the title, first word caps in the section headers, first word caps on each sentence), and so on. The tokenization process described as part of loading a section in memory 102 is also a form of syntactical analysis.

Semantical analysis deals with meaning. Semantical analysis includes identifying device and/or method type references in the title and testing for representation of corresponding type(s) in the claims, identifying claim elements and insuring proper antecedent basis for each element and proper reference for each antecedent element in the detailed description, insuring the detailed description is not too tenuous, etc.

Some analysis, such as syntactical grammar checking applies to most sections, but not all. For example, checking for proper sentence structure is mostly the same for all but the brief description of the drawings and the claims (and the drawings) because those two sections have their own unique sentence structure. Furthermore, there exist exceptions such as in the detailed description section which contains integer figure reference numbers which follow the named item in a non-standard grammatical way.

Procedures for semantical and syntactical analysis are described below, in much greater detail, for representative types of analysis. Note that computer tools which analyze standard English for proper grammatical analysis are commercially available (ref. Gramatik by Word Perfect Corporation, Novell Applications Group, 1555 N. Technology Way, Orem, Utah 84057-2399, and RIGHTwriter by Que, a division of Macmillan Computer Publishing, 11711 N. College Ave., Carmel, Ind. 46032) and are not further discussed here. However, such standard tools have not been enhanced and integrated into a patent text checker as described herein.

After each section is analyzed (step 104), the results of the analysis are reported (step 106). Alternatively, the results report (step 104) can be done after more than one, or even all of the analysis has been completed.

Results can be presented in a number of ways: the user can be presented the results on a computer screen, or a report can be created which describes the results and which can be stored in permanent memory, such as a hard disk, or printed on paper via a printer attached to the computer.

Results can be presented in numerous ways, depending on the nature of the results. Some results may identify errors in English usage (e.g., double words), legal requirements (e.g., claims numbered out of order), or user preferences. Other results may only represent warnings that something is likely to be in error. Additionally, results may include user aids.

A result of processing patent text may be the construction of a parts list representing the numbered elements in the detailed descriptions, or a parts list representing the antecedent basis elements in the claims, or a graphic tree of claim numbers representing the dependency relationships between the claims. The results which are user aids may be useful during the drafting of a patent application when, e.g., only the claims have been drafted and a parts list is desired to be used as a cross reference while writing the detailed description.

Figure 2:
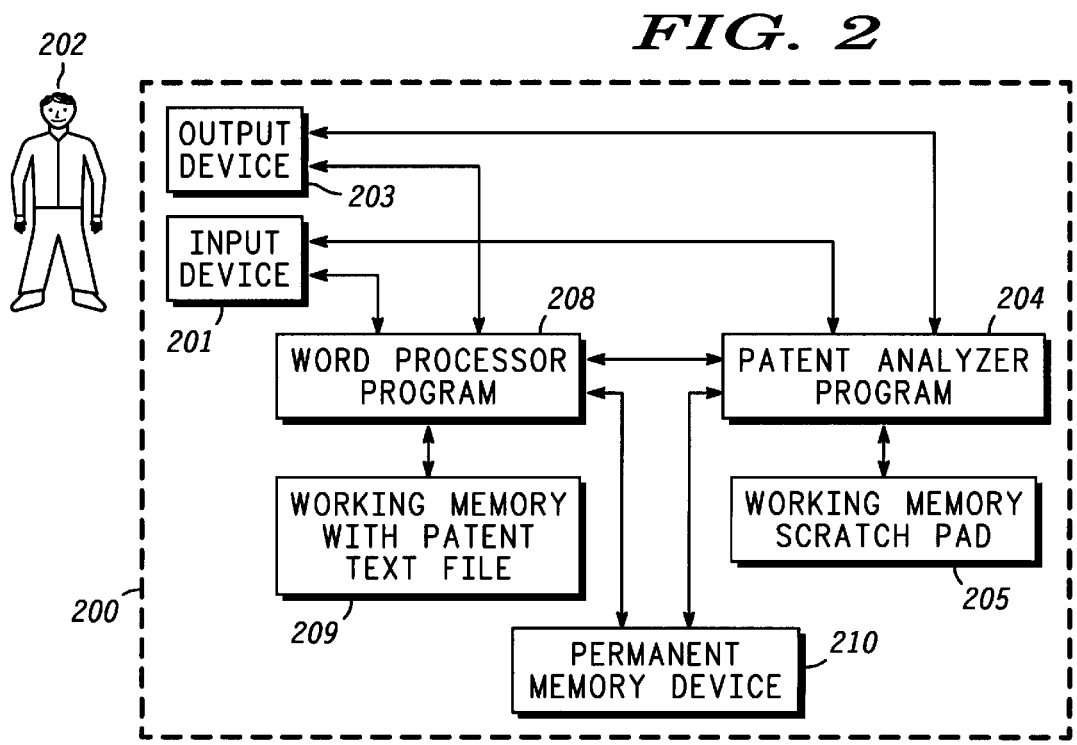
FIG. 2 is a diagram of a computer executing a patent analyzer integrated with a word processor program.

In FIG. 2, there is shown a user 202 interfacing with a computer 200 through input device 201 (such as a keyboard). The user 202 reads from an output device 203 (such as a display). Data may alternatively be presented to the user via a loudspeaker, or from the printout of a printer, etc., and data may be entered in alternative ways as well (such as with voice via a microphone, or via a mouse, etc.). The user 202 may interface directly with the patent analyzer program 204 which executes on the computer 200 and communicates with the user via the keyboard and display. In this mode, no other application program, such as a word processing program 208, is necessary to use the patent analyzer program 204. The program 204 can access the users patent application to be analyzed via the computer's 200 permanent memory 210 (such as a hard or floppy disk, or tape) and report results directly to the user 202, or save the results back to permanent memory 210, as user 202 directs.

Alternately, the patent analyzer program 204 in FIG. 2 can communicate with the user 202 via another program running concurrently on the same computer 200, such as a word processing program 208. In such a mode, the word processor program 208 can have a procedure for the user 202 to direct the word processor program 208 to initiate the analysis of a patent application which resides in the working memory 209 of the word processor program 208. The word processor program 208 would then "handshake" with the patent analyzer program 204 via facilities provided by the operating system of the computer 200. The handshaking may include: 1) the word processing program 208 starting the patent analyzer program 204 (if not already running), 2) the word processor program 208 providing data from the patent text file to the patent analyzer program 204 as needed by the analyzer program 204, and 3) the patent analyzer program 204 handing the results to the word processor program 208 to be reported to the user 202 through output device 203. Any of the three steps above are optional. For example, the user 202 may start the analysis via a facility such a menu option in the word processing program 208, but the patent analysis program 204 may present the user with data on the display 203, independent of the word processing program 208, for determining the order of processing, or for presenting results.

The word processor program 208 in FIG. 2 has its own working memory 209 in the computer 200 which is separate from the working memory 206 of the patent analyzer program 204, although there must be methods for transferring data between the two if the functionality of the word processor program 208 and the patent analyzer program 204 are integrated.

The method of transferring data between the working memory of the two programs is dependent on the computer operating system used on the computer 200. Typical methods can include methods for interprocess communications such as sockets on a Unix operating system, Apple Events on a Macintosh operating system, etc., or data passing via disk files.

Alternatively, it would also be possible to embed the methods for checking patent text entirely with a word processor, just as some word processors have done with spelling checkers, or with macro programming facilities provided by the word processor, etc. In such an alternative embodiment, programs 204 and 205 would be combined, and working memories 205 and 209 would be combined. It is also possible for a separate patent analyzer program 204 to utilize the working memory 209 of the word processor program minimizing the need for its own working memory 205.

In the preferred embodiment, the patent analyzer program 204 in FIG. 2 communicates with the user 202 via a dialog window to take user directions and to present results. Concurrent with the presenting of results in the patent analyzer program's 204 dialog window, the analyzer program 204 can also direct the word processor program 208 to highlight in the word processor's 208 display window the particular text in the patent application relevant to the results presented in the dialog window. The analyzer dialog window describes the error, warning, or aid while the word processing text window simultaneously displays the corresponding text. If the analyzer program 204 had determined a correction for the text, that correction can be presented to the user 202 in the dialog window. The user can then be offered options of fixing the patent application text by replacing the highlighted text in the text window with the suggested correction in the dialog window, noting the correction in a report log maintained by either the analyzer program or the word processor program, or ignoring the correction altogether. This mode of interfacing the user 202, a word processor program 208, and the patent analyzer program 204 is similar to the way word processing programs are often interfaced to spelling checkers or grammar checkers.

In further detail, FIG. 3 illustrates the task 100 of identifying boundaries 304 of the patent text sections, or subsections 302. This task is equivalent to identifying the start of each section, since immediately preceding each section is the end of the preceding section. There are two exceptions corresponding to the first and last patent text sections. The first section is typically the title, although other data such as a docket number may be placed prior to the title in the text file. Also, the end of the abstract coincides with the end of the patent text, which is typically at the end of the file, unless the format of the patent text file includes other data in the file, such as formatting data as might be used in a word processing program file format.

FIG. 3 shows an example of the start of a patent application text file as a patent analyzer program (step 204 in FIG. 1) views it. The display window of a word processor program or the printed page shows a formatted patent application with, for example, the title at the top of the first page followed by blank line(s), the "Field of the Invention" section header, more blank line(s), the paragraph starting, "This inventions relates to . . . ", etc., for the rest of the pages of the patent application. This same patent text appears to the patent analyzer program as a linear sequence of computer characters. In this format, paragraphs do not have multiple lines, but are simply strings of characters delimited by paragraph marks (or, carriage return characters, or line feed characters, depending on the operating system and word processor program, and shown as ¶ characters in FIG. 3). Two consecutive paragraph marks represent a blank line on the printed page. Most computer system utilize ASCII numbering conventions to represent text data, where, for example, the letter "M" is represented by the number 77, "m" is 109, a space character is 32, carriage return 13, line feed 10, etc. FIG. 3 shows letters instead of the numbers in each character position for convenience.

The same character string 300 shown in FIG. 3 as the computer actually stores them, using ASCII, appear as: 77, 69, 84, 72, 79, 68, 32, 70, 79, 82, . . . , 65, 78, 68, 32, 68, 82, 65, 87, 73, 78, 71, 83, 13, 13, 70, 105, 101, 108, 100, 32, 111, 102, 32, 116, 104, 101, 32, 73, 110, 118, 101, 110, 116, 105, 111, 110, 13, 13, 84, 104, 105, 115, 32, 105, 110, 118, 101, 110, 116, 105, 111, 110, 32, 114, 101, 108, 97, 116, 101, 115, . . . . The patent analyzer program sees these number strings, or similar strings, depending on the operating system of the computer, when reading patent text data from a disk file, but may see other representations of the data if the data is transferred by a word processor program 208.

The task of identifying section boundaries 304 can be simplified by searching first for section headers which precede most sections or subsections 302 of the text 300. A preferred method to do this is to scan the text 300 for double paragraph marks (whether line feeds, carriage returns, both, or in some other representation), and then to examine the next few characters (e.g., 50–100 characters, but not past the occurrence of double paragraph marks) for one or two keywords which can identify the section, such as "field", "brief description", etc. Note that any non-printing characters, such as a space or tab, must be ignored when between paragraph marks. That is, any number of spaces and tabs between two paragraph marks is considered to represent double paragraph marks. It is necessary to convert characters to all upper, or lower, case characters, or to compare the character string to multiple keywords, such as "FIELD", "Field", "field", etc. When key words are located shortly following blank lines (double paragraph marks), then the total line length should be measured. This is done by collecting all characters from the first blank line until the next blank line, deleting all space and tab characters from the beginning and end of the character string up to the first (and back to the last) printing character. The total number of characters remaining is the printing line length and can be compared to stored values for the section header(s) which also contain the keyword(s) found. A match of keywords and correct line length (within a specified range of length) gives an excellent indication that a section header is found, even when different patent drafting practitioners use slightly different headers, or when typographical errors exist in the header. The starting and ending position of each patent application section and subsection can be easily determined once all of the section headers have been identified.

The following describes methods of analysis of particular sections of patent text more specifically:

Patent text analysis can include recognizing errors in the overall, or global structure. Included in this type of analyses are: checks for correctly ordered, worded, spelled and formatted section headers; page breaks before the claims and before the abstract; plural/singular agreement between the brief description of the drawings header, the detailed description header, and the number of drawings; and application title agreement with the title in the abstract.

Analysis for section header correctness, once headers have been identified, is normally a matter of comparing the header to a table of acceptable headers. Checking for page breaks is similar to checking for paragraph marks, except that typically a form feed character is expected instead of a carriage return or line feed. If the words "FIG. 2" are found anywhere in the brief description or detailed description sections, the headers for those sections should use the word "Figures", and otherwise use the word "Figure". Comparing the two copies of the title is a straightforward character by character comparison.

Methods of analysis that can be applied to the title of the patent text include: verify that the title does not begin with the words "A" or "AN"; verify that the title does not include words like new, improved, better, etc.; and, identify device and/or method type references in the title to test for inclusion of corresponding type(s) of claims. The last check is a matter of testing for the presence of words like device, method, methods, process, processes, procedure(s), device(s), system (s), apparatus, structure(s), etc., in both the title and, for each device or method type word found, the presence of that word in at least one independent claim preamble.

Methods of analysis applied to the background of the invention section can include noting figures references to account for figures of prior art which may not be referenced in the detailed description section.

Methods of analysis applied to the brief description of the drawings section can include: verify that the described figures are described in numeric order, starting with FIG. 1; and, verify that singular and plural abbreviations for the word figure ("FIG.", "FIGs.", or "FIGS.") are applied properly and consistently.

Methods of analysis applied to the detailed description of the drawings section can include: verify that figures referenced agree with figures mentioned in the brief description section (excepting figure mentions in the background section), which is simply comparing each figure number used in both sections; verify that singular and plural abbreviations for the word figure ("FIG.", "FIGs.", or "FIGS.") are applied properly and consistently; identify figure element by name and reference number; and, verify that the detailed description is not too tenuous by counting the frequency of the use of words like "may" or "might".

Figure 6:
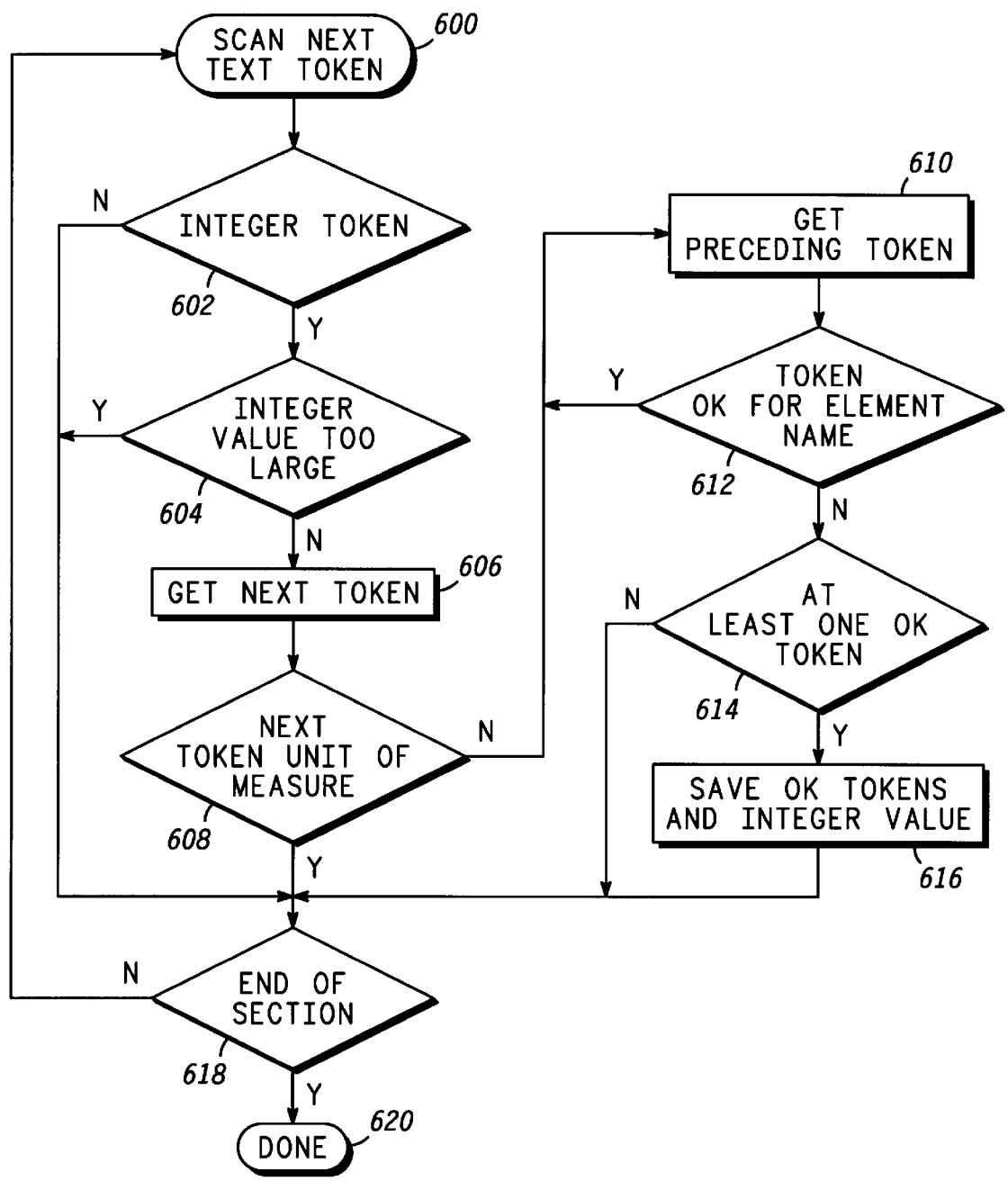
FIG. 6 is a flow chart illustrating a process for identifying numbered figure element in paragraphs of the detailed description section of patent text.

An illustration of a process for identifying numbered figure elements in paragraphs of the detailed description is shown in FIG. 6. Identifying figure elements in the detailed description requires first searching for integers (step 602 in FIG. 6) in the paragraphs of that section. Some integers are not figure reference numbers and can be identified and discarded if: they are followed by a unit of measure (step 608); are part of a standard date format (three integers separated by slashes or dashes, or following the name or abbreviation of a month (step 612)); are a patent number or otherwise too large (step 604) an integer to be considered a figure reference number; are following the word "FIG." or "FIGS." (step 612); or, are part of arithmetic equations noted by the immediate presence of arithmetic symbols such as a plus sign.

Once a figure reference number is located (step 610 in FIG. 6), the identification of the element name is accomplished by reversing the order of the words immediately preceding the reference number and inspecting the words in (reverse) order (step 610) looking for the probable first word of the element by eliminating all words (step 612) after the first word which cannot be part of a figure reference element name. That is, verbs, gerunds, prepositions, articles, and other words are seldom included as names of figure references and excluding the first such word preceding the reference number and all preceding words leaves the remaining words as part of the figure element name. If the first word preceding a figure reference number is unusable as an element name, then that number is not a figure reference number. As figure reference numbers and their element names are identified (step 614), they should be stored in working memory (step 616) for later reference when processing the claims, or for generating an elements list of the detailed description. As FIG. 6 illustrates this process continuing for the next text token (step 600 and 606) until a section end is reached (steps 618 and 620).

It is likely that additional leading words are included in figure reference element names, but that is only a minor inconvenience because when they are used in an element list as an aid to the user, the occasional extra leading words are easily ignored, and when they are referenced by the claims to determine if a claim element is supported in the detailed description, the claim element can be compared to the trailing words in the description element, ignoring extra leading words in the description element.

Methods of analysis applied to the claims section can include: verify each claim is a single sentence (periods only at the end of the claim number and at the end of the claim); verify correct claim numbering (integer followed by a period); and, verify correct claim number ordering (consecutive integers beginning with 1). These tests are difficult to implement because the claim numbers and periods after the numbers and after the claims are also used to determine where each claim starts and ends. Multiple errors can lead to incorrect parsing of the claim boundaries. The required ordered components for a claim are: blank line (double paragraph marks), integer, period, at least one space or tab, a capital letter, any number of characters not including a period, except where part of a decimal number, and lastly a period. As long as only one of these components are missing, the correct error can be identified without chance of mis-identifying the boundaries of the claim.

Included in claims section analysis can also be construction of a claim dependency "tree" which identifies each independent claim and each claim dependency, and verification of correct independent and dependent claim ordering (as prescribed by the Manual for Patent Examining Procedure (MPEP) published by the U.S. Patent and Trademark Office). "Tree" is meant to include any graphical representation showing the dependency relationships between claims, where each independent tree is a "trunk" and each dependent claim branches from the trunk or branch representing the claim it is dependent on.

FIGS. 4 and 5 illustrate two different representations of the same claim dependency tree. In FIG. 4, there are shown three independent trees 400, 402, and 404. The first independent tree 400 shows that claim 1 is an independent claim, claims 2, 3 and 5 are dependent on claim 1 (i.e., include all limitations of claim 1 as well as their own recited limitations), and that claim 4 is dependent on claim 2. Similarly, the independent dependency trees 402 and 404 can be interpreted with claim 6 and claim 11 being the independent claims, respectively. The group of independent claim trees 400, 402, and 404 together form a complete claim dependency tree for the particular patent text under consideration.

Notice in FIG. 4 that claim 4 is shown dependent on claim 2. Per the MPEP directions on ordering claims, either claim 4 should be dependent on claim 3, or claim 2 should be renumbered claim 3 and claim 3 renumbered claim 2, leaving claim 4 dependent on the newly numbered claim 3. Not knowing whether the error is the first or second case above, the patent analysis program identifies claim 4 and (optionally) claim 3 as having an ordering error by highlighting with superimposed ovals 406 over the potentially errant claim numbers. Any kind of highlighting can be used in order to draw the attention of the user to the problem.

FIG. 5 shows the exact same claim dependency information, i.e., complete claim dependency tree, as shown in FIG. 4, but in a different graphical representation. In FIG. 5, the claim dependency tree structure is in a table form where the leftmost column 1 contains only independent claims, and only one claim is shown per row. Each dependent claim is positioned in the table one column to the right, and in the next available row below the 30 claim it is dependent upon, that is, for a claim x in row i and column j, all claims starting in column j+1 from row i+1 and up to the first row having a claim in column j (or to the left of column j) are dependent on claim x. If a claim (typically claim x+1) is found in row i+1 and any column 1 through j, then no claims are dependent on claim x. Where claim ordering or numbering is in question, FIG. 5 shows one method of highlighting, drawing the user's attention to the problem by preceding the problem claim number with a warning symbol (in this case, four leading dots) and placing the claim number in boldface type.

A method for building the dependency tree is to search each claim preamble for the occurrence of the token word "claim" (or "claims") followed by an integer token(s), which represent dependent claims. Note is made of each independent claim, and for each dependent claim what claim(s) it is dependent upon. Conventional sorting and graphing procedures enable one to display this data in any preferred format, such as those shown in FIGS. 4 and 5. The table method of FIG. 5 may be preferred where good graphical tools are not readily available to display diagrams as shown in FIG. 4 on the computer display or printer.

Another method of analysis that can be used in claims section analysis is verification of proper use of colons and semicolons with proper placement of "and" in claim text after the last semicolon. A typical claim has one colon separating the preamble from the remaining claim parts. Each following claim part is separated by a semicolon, and only the last semicolon is immediately followed by an "and". Simple searching for colons (assuming colons within ratios have been tokenized out, as described above), semicolons, and semicolons immediately followed by "and" within each claim will expose any such errors. Using semantic analysis it is possible to analyze recursive colon-semicolon groupings. That is, a claim part where another colon followed by semicolon separated sub-parts are included. This method presents the simple analysis with the problem of multiple colons and at least one semicolon-and construct other than before the last claim part. In general, while such recursive structuring is permissible in a claim, simply warning the user of a potential error to cause close examination by the user is usually acceptable, and possibly preferable to the considerable processing likely required to semantically analyze such recursive constructs.

Additional methods of claim section analysis can include steps to: identify each claim element, noting whether it is an antecedent or reference; identify each reference element without strict antecedent basis; locate antecedent basis for each reference element; verify non-ambiguous antecedent basis for each element; and verify a reference for each antecedent basis later in the claim or in a dependent claim.

Identification of claim elements can be accomplished with a combined syntactic and semantic analysis of the claim wording. Claim word tokens can be scanned in order looking for key words used to introduce claim elements. The most obvious key words are "a", "m""an", "the", and "said". However, other claim elements, especially plural elements which are never introduced by "a" or "an" are introduced by, for example, verb form gerunds, like "identifying", "analyzing", "coupling", etc., which begin each method step; words and phrases like "at least", "multiplicity of", "all", etc.; and prepositions like "of", "to", "in", etc. Gerunds are easily recognized by comparing the last three letters of the token to "ing". Exceptions must be made for nouns like spring, and ring, which also end in "ing". Once the start of a potential element has been identified, the next step is to scan forward, examining each token for a word which can never belong in a claim element word phrase, including most prepositions, present tense verbs (which are never used as adjectives as past tense verbs often are), etc. This method is best accomplished with a lookup table of words which are never part of claim elements. This table may need to be modified depending on the subject matter of the patent application, as the technological jargon in one field may utilize a given word consistently as a different part of speech than that word is used within a different technology. After a range of tokens has been identified which potentially represents the first word of a claim element up to and possibly past the last word of the element, the method must examine the last word to determine if it is appropriate as the last word of an element, and recursively eliminate each trailing word that is not. For example, past tense verbs (tokens ending in "ed", with exceptions like "feed", along with a table of other past tense verbs) may be used as an adjective within a claim element (e.g., a "shifted"bit), but are never used as the last word of an element. Similarly, adjectives (including words ending in "able"), adverbs (words ending in "ly"), ordinal and cardinal numbers, etc., can be excluded as final words comprising a claim element phrase. If, after truncating words which generally are to be excluded from element phrases no words are left, then the original introductory phrase was likely misleading. However, some introductory phrases, such as "a", "an", and gerunds beginning method steps are always introducing claim elements and at least one word following should necessarily be noted as a claim element. Note that claim elements never cross claim part boundaries, that is, a colon or semicolon.

The nature of a claim element phrase's introductions easily determines if the element is an antecedent basis element, or a reference element (which always begins with "the" or "said". There are a few exceptions, such as in the case of the first element of a dependent claim, which may begin with "A" or "An", as in "A method as in claim 1 wherein . . . ", where "method" is a referring element, not an antecedent.

Checking for ambiguous or missing antecedent basis in claims involves scanning all antecedent basis elements preceding a reference element in a claim, as well as all antecedent elements in any claim that claim is dependent upon, and recursively with claims that claim depends from. If none are found, then the referring claim element is missing antecedent basis. If more than one is found, then the referring claim element has ambiguous antecedent basis. However, if the referring element is followed by the word "of" followed by another claim element, then that referring element is "qualified" by the following element, and its antecedent must be so qualified. For example, "the transistor of the first circuit" contains two reference claim elements: "transistor" and "first circuit". While "transistor" alone may have many antecedents, only one of them should be qualified by "of the first circuit".

Each antecedent basis element typically is referenced later in the claim, or in a dependent claim. Scanning forward from each antecedent in the claim and also in each dependent claim until the first reference to that antecedent is found (along with any qualifying elements) will satisfy the test for forward reference. Note that reporting an antecedent as not being further referenced will often result in many unnecessary reports as antecedents are often connected to other elements immediately when introduced and never need another reference (for example, the collector in "a transistor having a base, an emitter and a collector which is connected to ground"). It is preferable if a user has the option to receive these non-forward reference warnings.

Another complication to comparing reference elements to antecedent basis elements in order to find matches is that they are sometimes not worded exactly the same. For example, a reference "said first bit" may find its antecedent basis worded as "first and second bits". Such conjunctive antecedents can be broken into non-conjunctive parts and those parts stored along with the original antecedent wording in working memory. For example, note that "first and second bits" may be later referred to as "first and second bits", "first bit", or "second bit". Wording changes giving rise to false antecedent basis errors can thus be minimized by noting all of the permutations of conjunctive antecedent basis when first parsing antecedents.

When a conjunctive reference element is found, such as "said first and second bits", the antecedents "first and second bits", "first bit" and "second bit" should all be searched for. One "first bit" and one "second bit" reference is correct, but a "first and second bits" antecedent and a separate "first bit" antecedent (not as permutations of the same antecedent) represent ambiguous antecedent basis for that reference.

A preferred technique for handling element identification of claim elements, permuting conjunctive elements, and other grammar type processing used throughout this invention is with Definite Clause Grammars (DCG) expressed in the Prolog programming language. This technology of programming makes searching tokens very straightforward and is a preferred method of language parsing throughout much of the computer science, linguistics, natural language, and artificial intelligence research communities. Textbooks which teach both the Prolog programming language and DCG technology, which are automatically executable by most commercial Prolog compilers, are "Prolog Programming for Artificial Intelligence", second edition, by Ivan Bratko, published by Addison Wesley in 1990, ISBN number 0-201-41606-9, and "The Craft of Prolog" by Richard A. O'Keefe, published by The MIT Press in 1990, ISBN number 0-26215039-5.

Additional methods of claim section analysis can include the determination whether each antecedent basis element is referenced in the detailed description section and whether it has a figure reference element number. Certain phrases in claim elements are often not included in the detailed description, such as "at least", "multiplicity of", "first", etc. Those standard quantifiers should be removed from the antecedent element wording before it is compared against phrases in the detailed description.

When the detailed description was parsed using figure reference numbers to identify the end of the element phrase, those elements were stored in working memory to construct a detailed description parts list. The elements so stored can also be used for determination of claim antecedent support. The claim elements can be compared to the detailed description elements allowing the leading words of the detailed description elements to be ignored if necessary (the method used to identify the elements in the detailed description has a slight tendency to include additional leading words). If an antecedent element cannot be found by scanning known figure references in the detailed description, then each sentence of each paragraph in the patent application specification (background, summary, and detailed description) must be searched until the words of the antecedent are located (in order) in the specification. When a known figure reference element matches the antecedent element, then proper support is provided in the specification. Also, if the antecedent is found in the specification, but not as a numbered figure reference element, then a report should be made that the antecedent has specification support, but lacks figure support.

Methods of analysis that can be applied to the abstract include: verify that no more than 150 words are used; verify that figure references (all integers that would pass the same test used for figure reference numbers in the detailed description) are included within parenthesis; and, verify that no "legalese" or other objectionable terminology is used, such as: "said", "means", "comprising", "there is disclosed", "essential", etc.

The drawings that illustrate embodiments of a specific invention and that accompany patent text are typically created with a computer drawing tool, such as a Computer Aided Design (CAD) tool. This allows the patent analyzer method to recognize patent text drawing references. The drawing tool typically is capable of producing an ASCII text representation of the drawing elements. For example, most drawing tools are capable of producing Initial Graphics Exchange Specification (IGES) (see Federal Information Processing Standards publication number 177) ASCII files which describe the various components of the drawings. The loading step 102 (i.e., loading drawing files into working memory) and analysis step 104 shown in FIG. 1 are different in detail when processing CAD files than when processing word processing text files, but are substantially the same so long as patent text (alphanumeric drawing data) components of the drawing data are extracted. Also easily extracted from drawing files is positioning information for the text components. Therefore, captions such as "FIG. 2" and reference numbers can be extracted. When multiple figures are included within single drawing files, reference numbers can be correlated to the figure caption by considering the positioning information contained in the files. Given this text based information, verification can be made that drawings identified in the brief description of the drawings section agree with the figures in the corresponding drawing file, and that the figure reference numbers in the detailed description section correspond to the figure reference numbers contained in the drawings.

Figure 7:
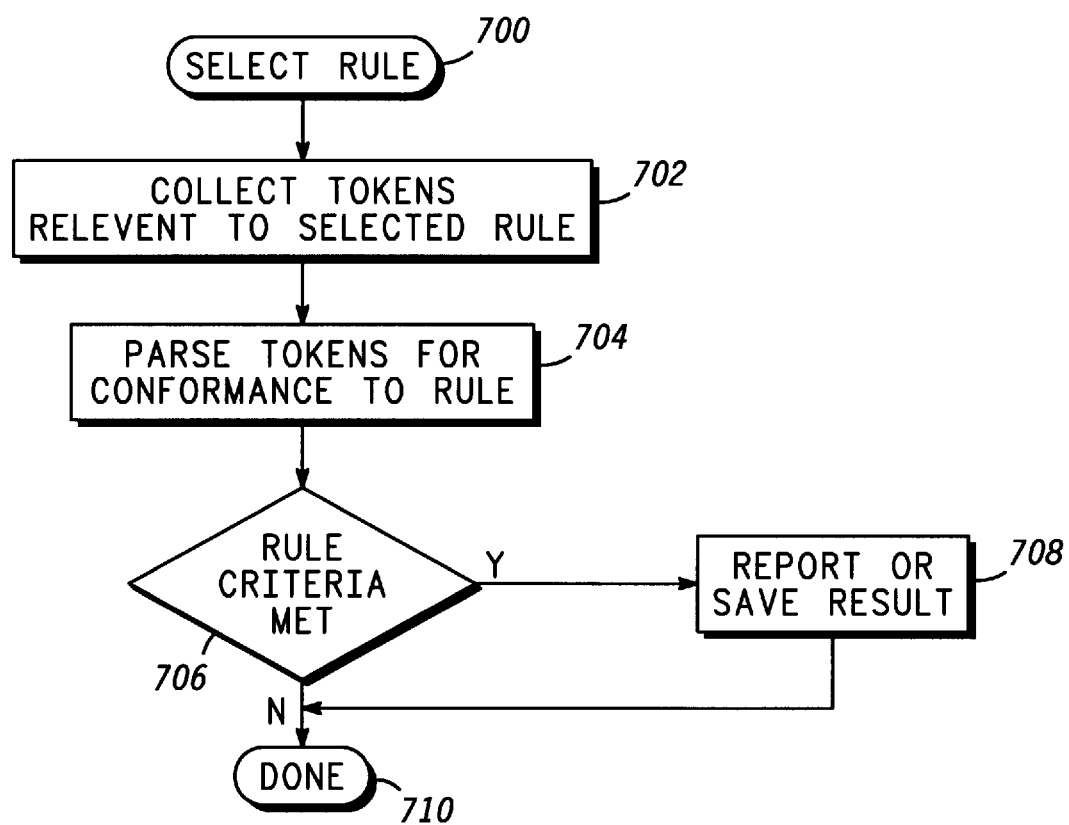
FIG. 7 is a flow chart illustrating a process for applying rules to patent text.

A useful way of describing the patent text analysis process set forth above is to view the patent text analyzer as a system that analyzes and verifies patent text according to various rules. This view is shown in FIG. 7 as a different perspective for the analyzing step 104 shown in FIG. 1. In FIG. 7, for each rule selected (step 700), the portions of patent text related by that rule are collected into working memory (step 702-after the raw patent text has already been tokenized), parsed according to criteria relevant to the rule (step 704) and tested for conformance to the rule (step 706). If the text fails to pass the test, or conversely, demonstrates errors or other conditions of interest defined by the rule, such as compliance to predetermined standards or user preferences, then the condition is noted for reporting to the user (step 708). This process can be repeated for any number of rules or standards until finished (step 710).

The methods described herein, in accordance with a preferred embodiment of the invention, can include many hundreds of rules or more. These rules can embody U.S. or foreign patent law, U.S. Patent and Trademark Office requirements, and/or user preferences. These rules can include rules for analyzing the title, sections headers, section order, English grammar rules, and exception to the English grammar rules and rules for identifying figure elements, identifying elements in the claims, and identifying inappropriate words in the abstract, among many others.

In summary, the present invention provides a new and useful method for syntactic and semantic analysis of patent text and drawings. The improvements over prior art are significant.

The present invention has been described above with reference to preferred embodiments. However, those skilled in the art will recognize that changes and modifications may be made in these preferred embodiments without departing from the scope of the present invention. For example, those skilled in the art will appreciate that the sequence and classification of tasks described above may be varied while accomplishing substantially the same processes. Likewise, those skilled in the art will appreciate that fewer or additional tests and rules for reviewing patent text may be incorporated into the patent analysis process. These and other changes and modifications which are obvious to those skilled in the art are intended to be included within the scope of the present invention.

What is claimed is:

1. A method for processing patent text in a computer, the method comprising the steps of:

identifying boundaries of a plurality of parts of the patent text;

loading at least one of the plurality of parts of the patent text into a working memory of a computer;

analyzing the at least one of the plurality of parts of the patent text, including the substeps of:

recognizing patent text drawing references;

loading drawing data from one or more computer drawing files into the working memory of the computer, wherein the one or more computer drawing files and said patent text correspond to a specific invention;

extracting alphanumeric drawing data from the drawing data; and comparing the patent text drawing references with the alphanumeric drawing data: and reporting results to a user.

2. A method as claimed in claim 1, wherein at least one of the steps of identifying, loading, analyzing, and reporting includes a step of integrating with a word processor program.

3. A method as claimed in claim 1, wherein said at least one of the plurality of parts of the patent text comprise patent claims and wherein the step of analyzing includes a step of analyzing a claim dependency among the patent claims.

4. A method as claimed in claim 3, wherein the step of reporting includes a step of reporting the claim dependency in a graphical manner.

5. A method as claimed in claim 1, wherein the step of analyzing comprises a step of finding errors in the patent text.

6. A method as claimed in claim 1, wherein the step of analyzing comprises a step of testing the at least one of a plurality of parts for compliance to a plurality of standards.

7. A method as claimed in claim 6, wherein the step of testing comprises a step of testing for compliance to U.S. Patent and Trademark Office standards.

8. A method as claimed in claim 6, wherein the step of testing comprises a step of testing for compliance to a plurality of user preferences.

9. A method for processing patent text in a computer, the method comprising the steps of:

identifying boundaries of a plurality of parts of the patent text;

analyzing at least one of the plurality of parts of the patent text, including the substeps of:

recognizing patent text drawing references;

loading drawing data from one or more computer drawing files info memory of a computer, wherein the one or more computer drawing files and said patent text correspond to a specific invention;

extracting alphanumeric drawing data from the drawing data; and comparing the patent text drawing references with the alphanumeric drawing data; and reporting results to a user.

10. A method as claimed in 9, wherein the step of identifying boundaries comprises the steps of:

searching for section headers;

examining text for section keywords;

measuring total line length; and matching the section keywords and the total line length to standard headers.

11. A method as claimed in claim 9, wherein the step of analyzing comprises the step of comparing order, wording, spelling and formatting of section headers to section header standards.

12. A method as claimed in 9, wherein the step of analyzing comprises the step of comparing plural/singular agreement between a brief description of drawings header, a detailed description header, and a count of drawings.

13. A method as claimed in claim 9, wherein the step of analyzing comprises the step of comparing application title agreement with an abstract title.

14. A method for processing patent text in a computer as claimed in claim 9, wherein the step of analyzing comprises the step of comparing figure references to account for figures of prior art not to be referred to in a detailed description section.

15. A method for processing patent text in a computer as claimed in 9, wherein the step of analyzing comprises the steps of:

verifying that figures are described in numeric order; and verifying that singular and plural abbreviations are applied according to a use standard.

16. A method for processing patent text in a computer as claimed in claim 9, wherein the step of analyzing comprises the step of verifying that figures referenced agree with figures in a brief description section.

17. A method for processing patent text in a computer as claimed in 9, wherein the step of analyzing comprises the step of identifying figure elements by name and reference number.

18. A method for processing patent text in a computer as claimed in claim 17, wherein the step of identifying figure elements comprises the steps of:

searching for integers in paragraphs of a section;

discarding integers that are not figure reference numbers; and reversing order of words immediately preceding a given figure reference number and inspecting the words in reverse order looking for a probable first word of an element name.

19. A method for processing patent text in a computer as claimed in claim 9, wherein the step of analyzing comprises the step of verifying each claim is a single sentence.

20. A method for processing patent text in a computer as claimed in claim 9, wherein the step of analyzing comprises the step of verifying consecutive claim number ordering.

21. A method for processing patent text in a computer as claimed in 9, wherein the step of analyzing comprises the step of verifying proper use of colons, semicolons, and placement of "and" in claim text.

22. A method for processing patent text in a computer as claimed in 9, wherein the step of analyzing comprises the step of verifying independent and dependent claim ordering as prescribed by a U.S. Patent and Trademark Office Manual for Patent Examining Procedure (MPEP).

23. A method for processing patent text in a computer as claimed in 10, wherein the step of analyzing comprises the steps of:

identifying each claim element, noting whether it is an antecedent or reference element; and identifying each reference element without strict antecedent basis.

24. A method for processing patent text in a computer as claimed in claim 23, wherein the step of analyzing further comprises the steps of:

locating antecedent basis for each reference element; and verifying non-ambiguous antecedent basis for each claim element.

25. A method for processing patent text in a computer as claimed in claim 23, wherein the step of analyzing further comprises the step of determining whether each claim element is referenced in a detailed description section of the patent text.

26. A method for processing patent text in a computer as claimed in 9, wherein the step of analyzing comprises the step of verifying that no more than a predetermined number of words are used in an abstract section of the patent text.

27. A method for processing patent text in a computer as claimed in 9, wherein the step of analyzing comprises the step of verifying that no predetermined objectionable terminology is used in the abstract section.

28. A method for processing patent text in a computer as claimed in 9, wherein the step of analyzing comprises the step of verifying that figure references are included within parenthesis in an abstract section.

29. A method for analyzing patent text in a computer, the method comprising the step of verifying a rule has been correctly followed, wherein the rule is selected from the group consisting of:

figure references included within parenthesis in an abstract section;

no predetermined objectionable terminology in the abstract section;

units of measure in metric units;

sections properly ordered;

page breaks precede a claims section and the abstract section;

plural/singular agreement with a figure number in a header for a detailed description section and a header for a brief description section and a count of figures;

a title agreement of the patent text and in the abstract section;

the figures in numeric order in the brief description section and in the detailed description section;

singular and plural abbreviations according to a use standard;

each claim a single sentence;

claims in sequential order;

colons, semicolons, and placement of "and" proper in claim text;

independent and dependent claim ordering per a U.S. Patent and Trademark Office Manual for Patent Examining Procedure (MPEP);

order, wording, spelling, and section header formats per section header standards;

figure references agreement in the detailed description section and the brief description section;

strict antecedent basis for reference claim elements;

non-ambiguous antecedent basis for the reference claim elements;

antecedent claim elements referenced in the detailed description section;

the patent text drawing references in agreement with drawing data extracted from one or more drawing files from a computer; or the abstract section not exceeding a predetermined word count.

30. A method for processing patent text in a computer, the method comprising the steps of:

recognizing patent text drawing references;

receiving drawing data from one or more computer drawing files, wherein the one or more computer drawing files and said patent text correspond to a specific invention;

extracting alphanumeric drawing data from the drawing data;

comparing the patent text drawing references with the alphanumeric drawing data; and reporting results to a user.

31. The method of claim 30 further including the steps of:

identifying a plurality of sections of the patent text;

identifying figure elements by name and reference number, searching for integers in paragraphs of a section;

discarding integers that are not figure reference numbers; and reversing order of words immediately preceding a given figure reference number and inspecting the words in reverse order looking for a probable first word of an element name.

32. A method for processing patent text in a computer, the method comprising the steps of:

identifying boundaries of a plurality of parts of the patent text;

loading at least one of the plurality of parts of the patent text into a working memory of a computer;

analyzing the at least one of the plurality of parts of the patent text including systematically parsing characters of the patent text into tokens to determine correctness and punctuation of the patent text; and reporting results to a user.

33. A method for processing patent text in a computer, the method comprising the steps of:

identifying boundaries of a plurality of parts of the patent text including the substeps of:
searching for section headers;
examining text for section keywords;
measuring total line length; and
matching the section keywords and the total line length to standard headers;

loading at least one of the plurality of parts of the patent text into a working memory of a computer;

analyzing the at least one of the plurality of parts of the patent text including; and reporting results to a user.

34. A method for processing patent text in a computer, the method comprising the steps of:

identifying boundaries of a plurality of parts of the patent text;

loading at least one of the plurality of parts of the patent text into a working memory of a computer;

analyzing the at least one of the plurality of parts of the patent text including the substeps of:
locating antecedent basis for each reference element; and
verifying non-ambiguous antecedent basis for each claim element; and reporting results to a user.

* * * * *